(12) United States Patent
MacLaughlin et al.

(10) Patent No.: US 11,759,819 B2
(45) Date of Patent: Sep. 19, 2023

(54) COATING PROCESS BY ION EXCHANGE

(71) Applicant: Bluescope Steel Limited, Melbourne (AU)

(72) Inventors: Shane A. MacLaughlin, Balgownie (AU); Binbin Xi, Figtree (AU)

(73) Assignee: BLUESCOPE STEEL LIMITED, Melbourne (AU)

( * ) Notice: Subject to any disclaimer, the term of this patent is extended or adjusted under 35 U.S.C. 154(b) by 1137 days.

(21) Appl. No.: 16/302,218

(22) PCT Filed: May 16, 2017

(86) PCT No.: PCT/AU2017/050448
§ 371 (c)(1),
(2) Date: Nov. 16, 2018

(87) PCT Pub. No.: WO2017/197448
PCT Pub. Date: Nov. 23, 2017

(65) Prior Publication Data
US 2019/0291132 A1 Sep. 26, 2019

(30) Foreign Application Priority Data
May 16, 2016 (AU) .............. 2016901812

(51) Int. Cl.
*B05D 1/36* (2006.01)
*B05D 7/14* (2006.01)
(Continued)

(52) U.S. Cl.
CPC ............ *B05D 1/36* (2013.01); *B05D 7/14* (2013.01); *C09K 23/54* (2022.01); *C09D 5/00* (2013.01); *C09K 23/18* (2022.01)

(58) Field of Classification Search
None
See application file for complete search history.

(56) References Cited

U.S. PATENT DOCUMENTS

2001/0045676 A1* 11/2001 Winterton ........ B29D 11/00048
264/2.5
2005/0008613 A1 1/2005 Peterson et al.
(Continued)

FOREIGN PATENT DOCUMENTS

JP 6144971 3/1986
JP S6144971 A 3/1986
(Continued)

OTHER PUBLICATIONS

Australian Patent Office International-Type Search Report for Application No. 2015901771 dated Jul. 6, 2015 (8 pages).
(Continued)

*Primary Examiner* — Francisco W Tschen
(74) *Attorney, Agent, or Firm* — STERNE, KESSLER, GOLDSTEIN & FOX P.L.L.C.

(57) ABSTRACT

A process for coating a product by ion exchange including: a) providing a product that contains a surface segregating species (SSS) having a low surface energy component and an ionic component wherein the SSS has segregated to an outer surface of the product to form an activated surface; and b) treating the activated surface of the product with a liquid containing a surface modifying agent comprising one or more polyionic species, wherein the polyionic species is attracted to and deposits on the activated surface through a process of ion exchange.

35 Claims, 9 Drawing Sheets

(51) Int. Cl.
*C09D 5/00* (2006.01)
*C09K 23/54* (2022.01)
*C09K 23/18* (2022.01)

(56) References Cited

U.S. PATENT DOCUMENTS

| | | |
|---|---|---|
| 2005/0113559 A1 | 5/2005 | Yang |
| 2007/0196663 A1 | 8/2007 | Schwartz et al. |
| 2009/0075028 A1* | 3/2009 | Suzuki .............. B05D 7/14 428/423.1 |
| 2009/0202816 A1* | 8/2009 | Schlenoff ............ C09K 3/1409 977/773 |
| 2010/0062200 A1 | 3/2010 | Domes et al. |
| 2012/0082831 A1* | 4/2012 | Wang ................ B82Y 30/00 427/164 |
| 2015/0024925 A1* | 1/2015 | Maclaughlin .......... B01J 35/006 502/158 |
| 2016/0136685 A1 | 5/2016 | Ettrich et al. |

FOREIGN PATENT DOCUMENTS

| | | |
|---|---|---|
| JP | 03122138 | 5/1991 |
| JP | H05320931 A | 12/1993 |
| JP | H06313278 A | 11/1994 |
| JP | 2012092444 A | 5/2012 |
| JP | 2015085692 A | 5/2015 |
| WO | 2010149729 A1 | 12/2010 |

OTHER PUBLICATIONS

Translation of Japanese Patent Office Notice of reasons for rejection for Application No. 2018-560161 dated Dec. 8, 2020 (3 pages).
Intellectual Property India Examination Report for Application No. 202118033514 dated Mar. 28, 2022 (4 pages including English translation).
International Search Report for Application No. PCT/AU2017/050448 dated Jul. 27, 2017 (4 pages).
International Preliminary Search on Patentability for Application No. PCT/AU2017/050448 dated Apr. 24, 2018 (10 pages).

* cited by examiner

COATING PROCESS BY ION EXCHANGE

TECHNICAL FIELD

A process for coating substrates by an ion exchange method is disclosed. The process is based upon the utilisation of a surface segregating species to activate the substrate surface, which is then treated with a surface modifying agent to form a coating on the substrate. The process may take the form of a coating process for pre-painted products, or the process may include a step that applies the surface segregating species to the product surface. The present disclosure extends to coated products produced by the present method. The present disclosure also extends to a composition for producing a coated product.

BACKGROUND ART

It is often desirable to have materials that are capable of providing multiple functionalities. A fixed set of properties are conferred by the bulk material, such as opacity, mechanical strength, colour, etc. Multiple properties may be conferred on extruded polymers by providing a laminated structure of materials that confer their individual properties on the composite. These are complex coextrusion constructions and are largely limited to polymer film applications such as packaging and adhesive lamination. In these cases the surface properties are those of the outermost polymer layer. This multilayer approach is much less practical for paints, including coil coatings. Thermosetting coil coatings may comprise a thin primer layer of 5 to 10 microns overlaid by a thicker colour coat of 10 or more microns. Most coating facilities are capable of applying two coats in a single line pass. Occasionally a third paint layer may be applied but multiple line passes carry a steep economic penalty due to lost opportunity cost and the practice is normally avoided. As in the case of co-extrusions the surface properties are those of the outermost layer.

Additional functional properties may be introduced by incorporating additives into the bulk polymer or paint matrix. This may be in the form of pigments that provide properties such as colour, UV transparency and heat reflectivity, or fillers that alter bulk mechanical properties. However the bulk additive approach is not efficient for surface properties that are not related to the mass of material. For example, antimicrobial properties can be conferred by adding a silver-containing glass particle but most of the glass remains buried in the bulk film and the silver ion is therefore poorly utilised.

One approach to changing material properties is to modify the surface. Examples of desirable properties that are largely or entirely a function of surface composition include, but are not limited to, hardness, toughness, abrasion resistance, UV resistance, a targeted level of surface reflectivity, electrical properties, enhanced adhesion to other materials, self-cleaning, lubricity, water wettability, hydrophobicity, oleophobicity, dirt resistance, antimicrobial action and resistance to microbial settling.

Ideally these properties could be introduced by formation of thin functional layers on the surface of the bulk material. However, while there are many methods used to modify the surfaces of these commodity products, they each suffer from one or more handicaps in that they are complex, expensive, and/or limited in application.

The surfaces of most paints and polymers are difficult to modify because they tend to be chemically inert. They are often hydrophobic to the degree that wetting with water-based products is difficult and adhesion to other materials is poor. Solvent wetting is easier but polymers and paints will normally absorb organic materials, sometimes destroying existing surface properties. In addition the use of solvents often contributes to emissions of volatile organic pollutants. Surfactants may be used to improve the wetting of aqueous treatments but the level of surfactants required tend to be high, they often interact with the functional treatment to alter its properties, and uniform wetting of the surface on the micrometre scale is not always achieved initially, or maintained through the drying process, particularly on rough surfaces. Typically the treatment chemical accumulates in the low spots while peaks are less well coated, if at all. This is not an acceptable for properties that require complete coverage at the nanoscale with good control of film thickness.

The low surface energy of hydrophobic materials and consequent weak ability to interact with other materials results in poor adhesive interactions with other materials. As a result of these problems it can be difficult to modify the surfaces of polymers and paints with simple methods and to maintain surface properties in service.

These problems may be overcome by altering the surface chemistry to introduce polar functional groups on the surface. Corona treatment, flame treatment, plasma etching and chromic acid oxidation can be effective for enhancing the adhesive properties of a surface for e.g. printing and lamination purposes, but their use is largely limited to these areas. These treatments suffer from the following disadvantages:

The requirement of an additional process step to implement the modification;

The longevity of the treatment can be compromised due to the ability of polymers/paints on the surface to reorient and rearrange to minimise interfacial energy in response to their environment.

The nature of the functional groups introduced by these oxidising treatments can degrade the durability of the polymer/paint by acting as sites for the initiation of free radical chain degradation processes. For example, it is well known that chromophores such as ketones introduced as a result of the oxidation process absorb UV light and initiate free radical degradation processes in otherwise stable polymeric hydrocarbon systems.

An additional disadvantage to chromic acid etching is the toxicity of chromic acid and the aggressive and uncontrolled nature of its interaction with the surface.

A potential alternative is a coating process driven by electrostatic attraction of polymers or particles to a surface, known as "layer-by-layer" or "LbL" coating. Advantages of the LbL process is that it is highly versatile in terms of the types of materials that can be used and the surface properties that can be conferred on the substrate, and the coating is precise and controllable on the nanometer scale. LbL coating proceeds in at least three but typically in as many as twenty or more steps and requires rinsing and drying steps at each stage of the process. It is therefore obviously not compatible with high speed, large surface area, commodity materials production because it is so slow and complicated.

The agent that provides the surface with electrostatic attraction is normally a post-applied polymer such as polyethylene imine. As such the process is dependent on the ability to uniformly coat the surface with the post-applied material, and the lifetime of the coating is limited by the adhesion of this absorbed layer. A potential alternative is to incorporate the activating agent as a bulk additive into the polymer. However this is an inefficient and expensive use of material as the agent is distributed through the entire bulk of the polymer. In addition, by becoming a major constituent of the material, it alters the properties of the product, including physical properties and durability, which are critical to its field performance requirements.

There is accordingly a need for a coating process that overcomes, or at least alleviates, one or more disadvantages of the prior art. There is also a need for a simple, general method for modifying the surfaces of commodity paints and polymers to impart desirable properties and increase the value of these materials. There is also a need for such a method that does not require the introduction of additional process steps that will add to overall production costs.

The above references to the background art do not constitute an admission that the art forms a part of the common general knowledge of a person of ordinary skill in the art. The above references are also not intended to limit the application of the apparatus and method as disclosed herein.

SUMMARY OF THE DISCLOSURE

In a first aspect there is disclosed a process for coating a product by ion exchange including:
a) providing a product that contains a surface segregating species having a low surface energy component and an ionic component wherein the surface segregating species has segregated to an outer surface of the product to form an activated surface; and
b) treating the activated surface of the product with a liquid containing a surface modifying agent which incorporates a surface modifying ionic material, wherein the surface modifying ionic material is attracted to and deposits on the activated surface in a process of ion exchange.

Definitions

As used herein, the following terms are defined as set out below:

"Surface segregating species" (herein also referred to as "SSS")—a material incorporating a surface segregating (low surface energy) component and an ionic component. The ionic component comprises a surface active ion and a mobile additive counterion. When provided on a substrate, the surface active ion component of the SSS activates the substrate to electrodeposition/ion exchange of an oppositely charged material.

"Surface active ion"—the part of the surface segregating species that is retained on the substrate surface and that attracts oppositely charged particles. The surface active ion may carry either a positive or negative charge.

"Mobile additive counterion"—the part of the surface segregating species that is dispersible in solution when exposed to the treatment suspension/solution. The mobile additive counterion may carry either a negative or positive charge.

"Treatment suspension/solution"—a solution or suspension of the surface-modifying agent.

"Surface modifying agent"—an ionic chemical species comprised of a surface-modifying ionic material and mobile phase counterion.

"Surface-modifying ionic material"—part of the surface modifying agent that is oppositely charged and attracted to the surface active ion during ion exchange deposition. The surface-modifying ionic material may carry either a positive or negative charge. Typical examples include but are not limited to an electrostatically stabilized colloidal suspension such as of a latex, a metal or non-metal oxide such as silica, material held in suspension through use of an ionic dispersant or as an emulsion, or a soluble polyionic organic polymer. These materials are typically polyionic i.e. they carry multiple charges when ionized.

"Mobile phase counterion"—part of the surface modifying agent that carries a charge opposite to that of the surface-modifying ionic material. The mobile phase counterion may carry either a positive or negative charge and is dispersible in solution after ion exchange deposition as described below.

"Mobile cation/anion pair"—the putative dissolved ionic salt resulting from pairing of the mobile additive counterion and the mobile phase counterion "Electroactive deposition" or "ion exchange deposition"—the process described herein where a surface-modifying ionic material in suspension in a liquid medium, (such as water), is electrostatically attracted to and deposited on the surface containing an oppositely charged surface active ion.

The product may have a unitary construction, and the surface segregating species (or "SSS") may be provided in an outer surface of the unitary product. For example, the product may comprise an extruded polymer in which SSS was added during manufacture.

Alternatively, the product may comprise an article having an outer layer applied thereto in which is provided the SSS. For example, the product may comprise a painted article and the SSS is provided in the paint layer. The SSS may be conveniently added to the paint when it is still liquid. During the painting/drying process it is segregated to the surface. The paint may be solvent based. Alternatively, the paint may be water based.

In an embodiment, the product comprises a painted metal substrate, such as steel, for example a steel coil.

The SSS has a low surface energy, or surface segregating, component and an ionic component. Without wishing to be constrained by theory, it is believed that these two components impart two functions on the SSS: the low surface energy part brings the SSS to the surface, and the ionic part allows for the separation of positive and negative charge so as to allow an ion exchange reaction to occur with subsequently applied reagents.

The low surface energy component of the SSS may comprise one or more of the following: a siloxane derivative, a long chain alkyl group, a branched structure, a nonionic surfactant of the alkylene oxide oligomer or polymer type, such as polyethylene oxide, a fluorocarbon or a dendrimer. In an embodiment, the low surface energy group is an organosilane derivative such as an alkoxy silane. In an embodiment the low surface energy group is a trialkoxysilane.

The ionic component of the SSS may be comprised of an organic cation (the surface active ion) covalently bound to the low surface energy component, in association with a mobile additive counterion. In particular, the surface active ion may comprise a cationic centre. In particular, the surface active ion may comprise a cation where the SSS is added to a solvent based paint. The cation may be an organic cation.

In an embodiment, the surface active ion may comprise an ammonium ion. In an embodiment, the surface active ion may comprise a quaternary ammonium ion.

In another embodiment, the surface active ion of the SSS may comprise an anion. In particular, the ionic component may comprise an anion where the SSS is or has been added to a water-based paint. The anion comprises part of the low surface energy group, ie the low surface energy group may be anionic. The low surface energy group may be a long chain alkyl group.

The surface segregating species may comprise a salt of an organic cation, such as a quaternary ammonium cation, a quaternary phosphonium ion, or a thiouronium cation. It may alternatively be comprised of a precursor of a salt of an organic cation, such as an amino compound which forms an ammonium ion on exposure to moisture. In a thermosetting paint formulation the SSS is preferably a quaternary ammonium salt ("QAS"). Preferably, the QAS experiences low charge shielding, such as due to the incorporation of alkyl chains of minimal length, preferably methyl groups. In an embodiment, the SSS is N-(3-trimethoxysilylpropyl)-N,N,N-trimethyl ammonium chloride. In another embodiment the SSS is N-(trimethoxysilyl) propyl-tetradecyldimethyl-ammonium chloride. In another embodiment the SSS is a benzyltrimethylammonium chloride. In another embodiment the SSS is N-(3-trimethoxysilylethyl)benzyl-N,N,N-trimethylammonium chloride. In another embodiment the SSS is CTAB. In another embodiment the SSS is Silquat AO (Hydrophilic). In another embodiment the SSS is Silquat Di-10 (Hydrophilic). In another embodiment the SSS is Silquat 3150 (Hydrophobic).

The surface segregating species is segregated to an outer surface of the product to form an activated surface. That segregation may be via segregation of an SSS pre-existing in the product. Alternatively, the product may be treated with a SSS in order to form the activated surface. The activated surface enables the ionic component of the surface segregating species to engage in ion exchange reactions with reagents external to the product.

The activated surface of the product is then treated with a liquid containing a surface modifying agent and may comprise a treatment solution/suspension containing one or more surface modifying ionic materials in association with their corresponding mobile phase counter ions. In an embodiment, the surface modifying ionic materials may be dissolved in the liquid. In another embodiment, the surface modifying ionic materials may be held in suspension in the liquid by electrostatic stabilisation. After application to the activated surface, the surface modifying ionic materials are attracted to and deposit on the activated surface through a process of ion exchange. The SSS and surface modifying ionic materials have opposite charges. Accordingly, if the SSS ionic material is negatively charged, the surface modifying ionic material is positively charged. Conversely, if the SSS ionic material is positively charged, the surface modifying ionic material is negatively charged. Both the SSS and the surface modifying ionic materials have associated respective mobile additive counter ion and mobile phase counter ion of opposite charge (ie mobile cations and mobile anions). The surface modifying ionic materials undergo ionic exchange with the mobile additive counterions associated with the SSS, such that the surface modifying ionic material becomes bound to the SSS, releasing the mobile cation/anion pair.

Examples of surface-modifying polyionic material include:
Silica colloids, including functionalised silica colloids. An example of a functionalised silica colliod is a bioresistant material sold under the trade name Bindzil. Another example is mesoporous silica that carries a leachable or fixed package of active material (e.g. an antimicrobial compound or a UV absorber).
Mixtures of silicas of various sizes. The topography that results from deposition of mixtures of particle sizes has been found in specific cases to contribute to superhydrophobic behaviour as well as to diminished adhesion of dirt and microbes.
Mixtures of silicas and polymer latexes. This can change the nature of the surface to make it amenable to further elaboration e.g. increase/decrease adhesion, friction, etc. . . .
Mixtures of silica colloids with other metal oxide particles. In this and other mixtures including silica colloids, the silica may effectively function as a binder for other materials that may alter the chemical properties of the surface.
Functionalised polymer latexes, such as functionalised acrylic latexes. An example is N-isopropylacrylamide or Nipaam. Nipaam undergoes a structural transition at 35 C that results in a dramatic surface reorganisation, with dire results for any adherent material. As a result it is highly effective for antimicrobial applications.
Mixtures of functional polymer latexes. For example it is known that surface composed of interleaving hydrophobic and hydrophilic domains show good antimicrobial properties, but they have been previously difficult to prepare. The size of the latex particles may vary, but typically will have a size that is capable of being bound into the silica matrix.
Layered double hydroxides or phyllosilicates. These have a range of interesting properties including oxygen and water barrier performance, intercalation of active species (e.g. UV absorbers, antimicrobials), antistatic, electrically conductive, superhydrophilic.
Graphene oxide. Potential for antistatic, conductivity, and extremely good oxygen and water barrier performance.
Particles of the nanometre (<100 nm) or micrometre scale (100 nm to 10 microns) suspended in water using electro steric dispersants (such as those used in the making of paints and inks). These particles may encompass a vast array of materials including common or specialty pigments, nanoparticulate metals and metal oxides or quantum dots.
Polyionic polymers
Conductive polymers.
Cyclodextrins.
Mixtures of any of the above with each other.

The activated surface of the product may be treated with a liquid containing one or more surface modifying agents. It is believed that the surface modifying ionic materials undergo ion exchange with the mobile additive counterions in a short period of time after the initial contact of the activated surface (eg paint surface) with the liquid (eg, aqueous phase) containing the surface modifying agent. The success of the ion exchange process is typically indicated by the formation of a uniform thin water film covering the surface (a "superhydrophilic" film). The ability to form this film is a function of a number of variables, such as the identity and concentration of the SSS, the concentration of the surface modifying ionic material, the pH of the aqueous phase, and the ionic strength of the aqueous phase. The speed of hydrophilic film formation increases with one or more of: increasing concentration of the SSS, increasing concentration of the surface modifying ionic material, decreasing pH of the aqueous phase, and increasing ionic strength of the aqueous phase.

The surface modifying ionic material may comprise or include a silica colloid. There is a broad range of commercial products that can be used including Ludox® (W.R. Grace), Bindzil® (Akzo Nobel), and Snowtex® (Nissan Chemical). These materials may be stabilised in suspension by mutual electrostatic repulsion due to ionisation of surface Si—OH functionality on the surface of the particles. In most cases the suspensions are rendered basic by addition of an alkali, typically sodium hydroxide or ammonium hydroxide. These materials range in size from 5 nm to over 100 nm. In some cases the particle surface is modified with a hydrolysed organofunctionalised alkoxysilane, as for example, certain of the Bindzil® line of products from Akzo Nobel which have been partially surface modified with hydrolysed 3-glycidoxypropyltrialkoxysilane.

These materials all function in the same basic way and the case of Ludox® HS-40, which has a particle size of 14 nm, is typical. This material is supplied at a concentration of 40% w/w in an aqueous suspension at pH 9. At concentrations above 0.25% w/w, pH≥7 this material is easily coated on paint surfaces containing the preferred SSS to form a superhydrophilic film. At a concentration of 0.25% and pH 7 the film formation is inhibited but can be improved by reducing pH or increasing ionic strength.

The concentration of SSS and/or pH of application to a product will vary depending on a number of factors. For example a thick coating may be applied at a relatively high SSS concentration and pH whereas a thin coating may require a low SSS concentration and low pH. Under some conditions, where the SSS is added to paint prior to application to a substrate, the concentration of SSS in paint may be greater than 0.5 wt %, such as greater than 2 wt %. It has been found that in at least some embodiments, it is difficult to form a deposit at SSS concentrations less than 2 wt %. The concentration of SSS in paint may be up to 10 wt %, such as 5 wt % or lower. It has been found that in at least some embodiments, a SSS concentration greater than 5 wt % is cost prohibitive and unnecessary.

The concentration of the surface modifying ionic materials also is dependent on a number of factors. In one embodiment, where the surface modifying ionic material comprises a silica colloid, it may have a concentration in the liquid of at least 0.5 wt %. In one embodiment, the pH is less than or equal to 10, preferably less than or equal to 9. In another embodiment, the pH of the liquid may be neutral or acidic, such as less than 7, preferably less than 6. The surface modifying ionic material containing liquid may have an ionic strength greater than 0.5 mol/L. Ionic strength may be adjusted, if desired, such as by addition of an ionic salt, eg NaCl, to the liquid.

In another embodiment, the surface modifying ionic material is a synthetic smectic phyllosilicate clay, such as that available under the trade name Laponite (BYK-Gardner GmbH), preferably Laponite S482. The activated surface may be treated with a suspension of phyllosilicate in water. The phyllosilicate may be present at a concentration of 0.5 wt % or higher. The phyllosilicate may be present at a concentration of 2 wt % or lower.

Without wishing to be limited by theory, it is believed that the present process can be explained according to the following physical model. The process of attracting dissolved or suspended surface modifying ionic material of an opposite charge can be considered as a quasi-equilibrium where surface modifying ionic material is moving into and out of proximity with the activated surface in such a way that a concentration gradient develops, being somewhat more dense in proximity to the surface due to electrostatic attraction. By virtue of its ionic nature the surface modifying ionic material is surrounded by a hydration sphere. As long as the surface modifying ionic materials in solution maintain their hydration spheres they are free to move in and out of proximity. As a result of the attraction and close approach some polyionic species lose the part hydration sphere separating them from the surface, coming into intimate contact and allowing the ion exchange process to take place, releasing the mobile cation/anion pair, and as a result becoming irreversibly bound to the activated surface. This process is entropically favoured by dispersion of the mobile counterion partners into the bulk liquid.

The activated surface is hydrophobic and resists wetting by water (water beads on the surface). When a surface modifying ionic material adsorbs irreversibly it retains the hydration layer in proximity with the aqueous phase and that part of the surface in the immediate region of the surface modifying ionic material now becomes hydrophilic.

When the density of absorbed surface modifying ionic material is sufficiently high the hydration spheres of the absorbed particles are able to maintain a continuous water layer. At this point the surface becomes superhydrophilic. See FIG. 1a to c. If the superhydrophilic layer is dried in place the material suspended in solution is also deposited on the surface (FIG. 1d). The electrostatically driven bonding of the surface modifying ionic material provides a level of adhesion well beyond what is possible by simple settling. This allows significant improvement in the uniformity of surface coverage as compared with uncontrolled drying of a non-electrostatically driven coating.

Hydrophobic shielding or charge shielding of the ionic component by pendant groups on the SSS can reduce the effectiveness of surface modifying ionic material deposition. Therefore it is desirable that the number of low surface energy extended alkyl chains attached to the charged nitrogen centre of a QAS be minimised. However at the same time a low surface energy group is necessary to allow migration of the SSS to the surface of the paint to provide a sufficient population to enhance deposition and adhesion of the surface modifying ionic material. Low surface energy groups vary in their effectiveness in terms of surface segregation vs problematic issues such as spontaneous disruption of the surface appearance. Consequently an effective SSS has a balance of diverse properties.

The same principle can be used to provide films incorporating mixtures of ionic materials or mixtures with non-ionic passenger particles or molecules that are carried in the superhydrophilic film and co-deposited when it dries. A special case is intercallation of neutral molecules in layered double hydroxides and smectic clays.

Accordingly, there is also provided a process for coating a product by ion exchange including:

a) providing a product that contains a surface segregating species having a surface segregating component and an ionic component wherein the surface segregating species has segregated to an outer surface of the product to form an activated surface; and
b) treating the activated surface with a liquid containing at least one surface modifying agent, wherein the surface modifying agent is attracted to and deposits on the activated surface through a process of ion exchange and forms a superhydrophilic layer thereon; and
c) drying the superhydrophilic layer to form said coating.

Advantages of the present process include:

The use of a surface segregating species in a paint layer (or in a polymer bulk material) to alter the properties of surfaces means that no additional treatment step is necessary. The process is essentially transparent to the surface modification technology.

As the modification is highly localised at the substrate surface, relatively small amounts of the surface segregating species are necessary. This minimises costs and allows use of relatively expensive materials such as customised siloxanes, fluorocarbons and dendrimers.

Localisation of the surface segregating species minimises alteration of the bulk mechanical properties of the substrate.

The process is highly versatile, allowing the potential application of numerous combinations of low surface energy and functional moieties provided that the surface population of additive is sufficient to induce the desired property.

The present process allows the modification of the surface of a coil coating paint in a manner that is consistent with the materials and process as they are currently constituted, with the exception of introducing a simple particle deposition step after curing which may be achieved by e.g. a spray or wash. Thus, the present process may be easily incorporated into existing coil coating operations.

The present process can provide microscopically or nanoscopically complete and uniform coverage of substrates, as compared with previous, non-electrostatically driven processes.

Unlike prior art LbL processes, the present process is simple, rapid, does not require multiple steps, and results in improved coating adhesion.

BRIEF DESCRIPTION OF THE DRAWINGS

Notwithstanding any other forms which may fall within the scope of the apparatus and method as set forth in the Summary, specific embodiments will now be described, by way of example only, with reference to the accompanying drawings in which:

FIG. 1a shows the initial attraction of suspended colloids (10) to the activated surface (20) and the quasi-equilibrium that may develop. FIG. 1b depicts cases where colloids in proximity to the activated surface lose part of their hydration sphere and become irreversibly bound to the substrate surface. This step is driven entropically by the release of bound water and by the dispersion of mobile counterions into the water layer. FIG. 1c depicts the formation of a superhydrophilic layer on the surface of the substrate as the density of adsorbed particles (10) reaches a critical limit. The water layer (30) sitting above the superhydrophilic surface contains additional material(s) which can now be deposited by drying of the water layer. FIG. 1d depicts the result of drying of the water film above the superhydrophilic surface where materials suspended in the water film are deposited randomly on the surface. This serves as a means to vary coating weight and to provide complex mixtures in the coating.

DETAILED DESCRIPTION OF SPECIFIC EMBODIMENTS

Examples

Figure 1A:
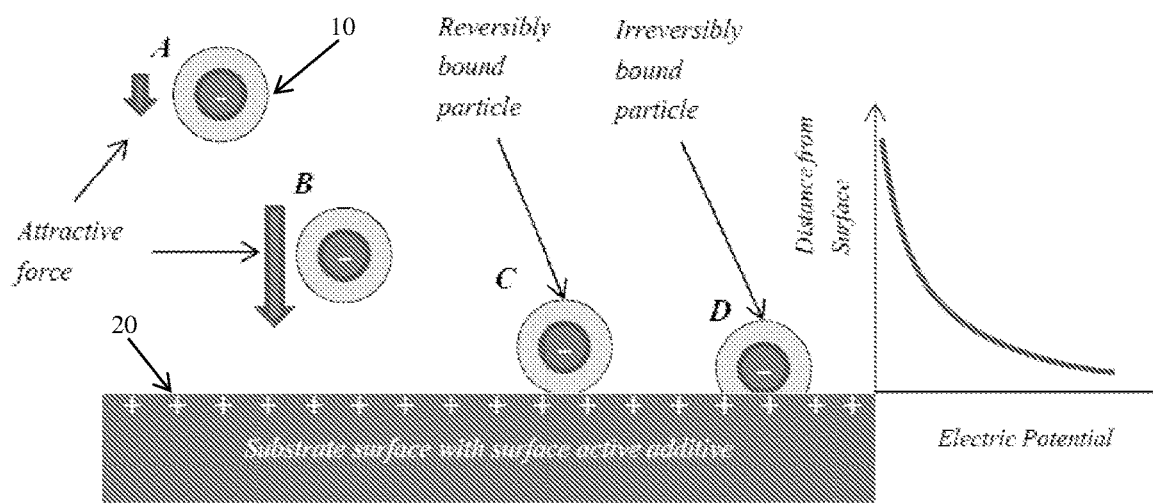
FIGS. 1a to 1d shows a proposed physical model for the present process.
Figure 1B:
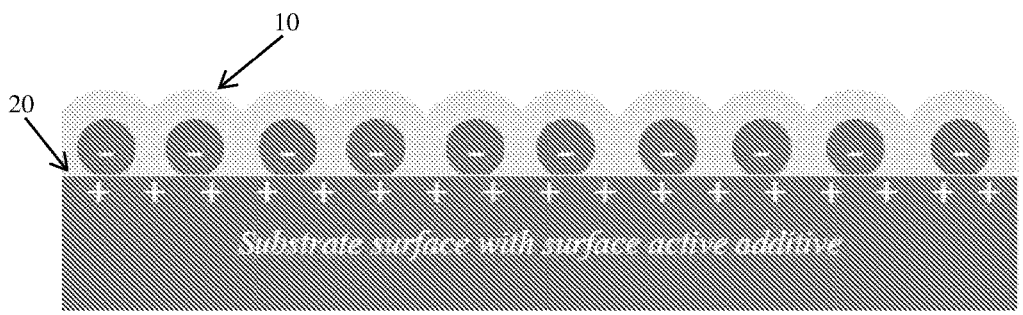
Figure 1C:
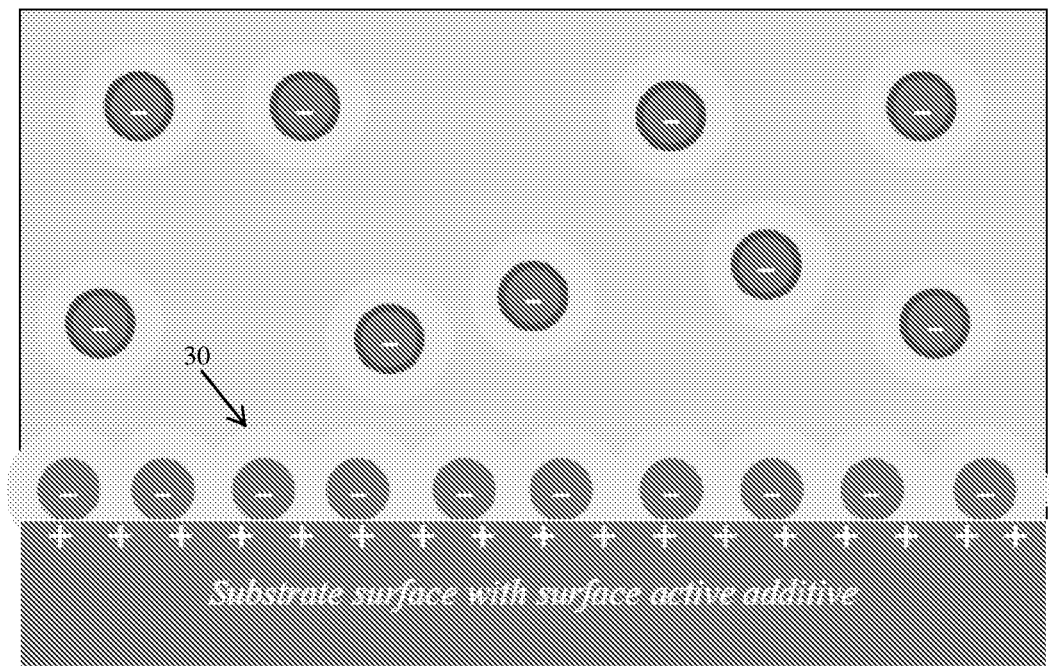
Figure 1D:
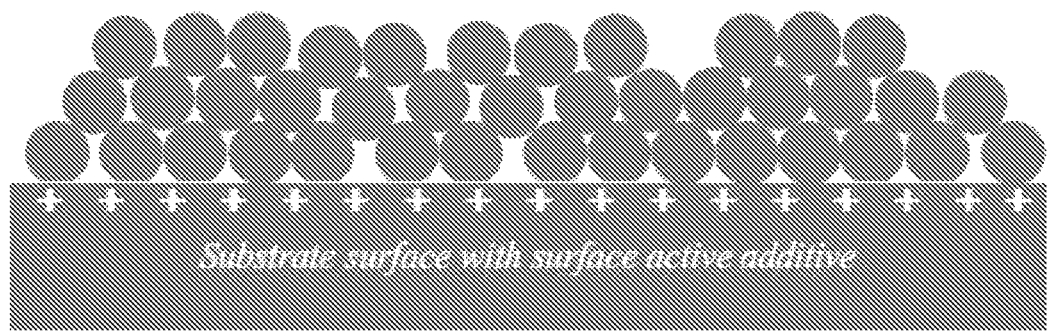

Non-limiting Examples of a process for coating a product by ion exchange will now be described.

Example 1 (Comparative): Water does not Wet the Standard Paint Surface

A panel of a commercial coil coating was prepared according to standard laboratory methods. The paint used was a solvent-borne thermal cure system comprised of hydroxyl functional polyester, alkylated melamine formaldehyde, titanium dioxide pigment, acid catalyst, and miscellaneous additives (PPG Industries). The paint was coated at a nominal thickness of 40 microns on a preprimed steel panel using a wire drawdown bar and cured for 45 s in an oven set to 300 C to reach a Peak Metal Temperature (PMT) of 235 C and a final thickness of approximately 20 microns. The panel was cooled to room temperature immediately on removal from the oven by quenching in a water bath. A sample cut from this panel was dipped into water. The interaction of the water with the paint surface was hydrophobic i.e. no wetting was observed and no water was retained on the panel. The contact angle of a droplet of water with this surface was 83°.

Example 2 (Comparative): Aqueous Ludox Suspension does not Wet the Standard Paint Surface A sample of the paint panel from Example 1 was dipped into a 5% w/w aqueous suspension of Ludox HS-40® colloidal silica. The interaction of the Ludox suspension with the paint surface was hydrophobic i.e. no wetting was observed and the aqueous suspension was not retained on the panel when withdrawn from the liquid.

Example 3 (Comparative): Aqueous Laponite S482 Suspension does not Wet the Standard Paint Surface A sample of the paint panel from Example 1 was dipped into a 2% w/w aqueous suspension of Laponite S482 synthetic phyllosilicate clay. The interaction of the Laponite suspension with the paint surface was hydrophobic i.e. no wetting was observed and the aqueous suspension was not retained on the panel when withdrawn from the liquid.

Example 4: Preparation of Active Paint

A liquid sample of the paint from example 1 (100 g) was mixed with a solution of electroactive deposition additive comprising N-(3-trimethoxysilylpropyl)-N,N,N-trimethyl ammonium chloride, 50% in methanol, (Gelest Industries) (6.8 g) to form a 5% w/w mixture of the additive in paint. The paint was coated on a primed steel panel and cured according to standard procedures as described in Example 1.

Example 5: Water does not Wet Activated Paint

A sample of the paint panel from Example 4 was dipped into water. The interaction of the water with the paint surface was hydrophobic i.e. no wetting was observed and no water was retained on the panel when withdrawn from the liquid. The contact angle of a droplet of water with this surface was 82°.

Example 6: Salt Solution does not Wet the Activated Paint

A sample of the paint panel from Example 4 was dipped into 1 M NaCl solution. The interaction of the solution with the paint surface was hydrophobic i.e. no wetting was observed and no water was retained on the panel when withdrawn from the solution. This shows that it is not sufficient that the wetting solution only contains an anion in order to induce hydrophilicity of the activated surface. It is inferred that the anionic species must be capable of irreversible attachment to the activated paint surface in order for superhydrophilicity to be manifested.

Example 7: Aqueous Ludox® Suspension does Wet the Activated Paint Panel

A sample of the steel panel from Example 4 was dipped into an aqueous suspension of 5% w/w Ludox HS-40® colloidal silica (Grace Chemical Industries). On removal of the panel from the aqueous suspension it was observed that the entire paint surface was covered in liquid film, i.e. the wetting of the liquid on this surface was superhydrophilic. The superhydrophilic film on the surface of the paint was allowed to dry. The contact angle of a droplet of water on this modified paint surface was below the measurement capability of the Goniometer (i.e. less than 10°).

Example 8: Establish Effect of Variable Ludox HS-40 Concentration

A sample of the steel panel from Example 4 was dipped into an aqueous suspension of Ludox HS-40® colloidal silica (Grace Chemical Industries) at concentrations of 0.5%, 0.25%, 0.1%, and 0.05% w/w. The panel was held in the Ludox® suspension for 5 seconds, then removed and the wetting of the suspension on the surface was observed. The panel was then dipped into each Ludox® suspension for a second period of 5 seconds and the wetting of the suspension on the surface was observed. Results are summarised in Table 1. Under these conditions the critical Ludox® concentration for complete wetting on the first dip is between 0.25 and 0.5% w/w. Critical concentration for wetting on a second dip is between 0.05 and 0.1% w/w. It is inferred from this example that particles are deposited irreversibly on the activated surface from suspensions with low concentrations of silica but the density of coverage is too low to provide superhydrophilic wetting without additional exposure.

TABLE 1

| Ludox ® Concentration (% w/w) | Wetting After 1$^{st}$ Dip, 5 s | Wetting After 2$^{nd}$ Dip, 5 s |
|---|---|---|
| 0.5 | ☺ | ☺ |
| 0.25 | ☹ | ☺ |
| 0.1 | ☹ | ☺ |
| 0.05 | ☹ | ☹ |

Superhydrophilic wetting-☺; Incomplete wetting-☹; Non-wetting-☹

Example 9 (Establish Effect of Variable Additive Concentration)

The paint from example 1 was formulated with variable amounts of the additive N-(3-trimethoxysilyl-propyl)-N,N,N-trimethyl ammonium chloride, 50% in methanol, (Gelest Industries). The resulting paints were applied to primed steel panels and cured as per the panels in example 1. Panels incorporating each lot of paint were dipped in a 6% w/w Ludox® suspension at pH≅9 for a period of 5 seconds. Wettability of the panel increases with increasing additive concentration in the paint. Results are summarised in Table 2.

TABLE 2

| Additive concentration in paint (% w/w) | Wetting after dip, 5 s |
|---|---|
| 5 | ☺ |
| 3 | ☺ |
| 2 | ☹ |
| 1 | ☹ |

Superhydrophilic wetting-☺; Non-wetting-☹

Example 10: Effect of Alternative Quaternary Ammonium Additive Benzyltrimethylammonium Chloride The paint from Example 1 was mixed with 5% w/w benzyltrimethylammonium chloride, drawn down on a primed steel panel and cured according to standard practices. The resultant paint film surface showed some disruption. Panel samples were dipped in Ludox® HS-40 suspensions prepared according to the specifications in Table 3. These results show that decreasing pH results in improved particle deposition (as measured by induction of surface wettability) even as the particle concentration decreases.

TABLE 3

| Ludox ® HS-40 concentration (% w/w) | pH | Wetting | Comments |
|---|---|---|---|
| 6.0 | 8-9 | ☹ | |
| 1.0 | 5-6 | ☺ | |
| 0.5 | 4 | ☺ | Patchy film after drying |

Example 11: Establish Effect of Variable Ionic Strength

The paint from Example 1 was mixed with 5% w/w benzyltrimethylammonium chloride, drawn down on a primed steel panel and cured according to standard practices. The resultant paint film surface showed some disruption. Panel samples were dipped in 6% w/w Ludox® HS-40 suspensions prepared according to the specifications in Table 3 where ionic strength was varied with additions of sodium chloride. These results show that increasing ionic strength results in improved particle deposition, as measured by the induction of surface wetting.

TABLE 4

| NaCl Concentration (mol L$^{-1}$) | Wetting after dip, ? s | Comments |
|---|---|---|
| 1.0 | ☺ | Drying produces patchy Ludox film; Ludox suspensions begins to gel at this ionic strength |
| 0.75 | ☺ | |
| 0.5 | ☺ | |
| 0.25 | ☹ | |
| 0 | ☹ | |

Superhydrophilic wetting-☺; Incomplete wetting-☺; Non-wetting-☹

Example 12: Establish Effect of Alternative Additives

The paint from Example 1 was formulated with alternative additives incorporating the some or all of the structural features descriptive of the additive N-(3-trimethoxysilyl-propyl)-N,N,N-trimethyl ammonium chloride, namely organic cation part, low surface energy (surfactant) part, trialkoxysilyl part. Results are summarised in Table 5. The optimum performance is exhibited by N-(3-trimethoxysilyl-propyl)-N,N,N-trimethyl ammonium chloride. A cationic centre is required for deposition of a Ludox® HS-40 suspension, rather than hydrolysed alkoxy silane. Hydrophobic shielding of the cation reduces the effective of deposition. A low surface energy group is necessary to manifest the effect. Low surface energy groups vary in their effectiveness. Some low surface energy groups lead to disruption of the paint surface.

TABLE 5

| Additive | Cation type | Surfactant type | Hydrolysable alkoxy silane | Concentration in paint |
|---|---|---|---|---|
| N-(trimethoxysilyl)-propyl-N,N,N-trimethyl ammonium chloride | Monoalkyltrimethyl QAS | Alkoxysilane | Yes | >3% |
| N-(trimethoxysilyl)propyl-tetradecyldimethyl-ammonium chloride | Dialkyldimethyl QAS | Alkoxysilane | Yes | 5%<br>5%<br>5% |
| 2-[methoxy(polyethyleneoxy) propyl]trimethoxysilane (6-9 EO units) | None | Alkoxysilane, oligomeric ethylene oxide | Yes | 5% |
| CTAB | Monoalkyltrimethyl QAS | Long chain alkyl | No | 5% |
| Didocyldimethylammonium bromide | Dialkyldimethyl QAS | Long chain alkyl | No | 5% |
| BYK 163 | Secondary Ammonium Ion | None | No | 3.0%<br>20.0% |
| BYK 2000 | Dialkyldimethyl QAS | None | No | 3.0%<br>20.0% |
| Benzyl trimethylammonium chloride | Monoalkyltrimethyl QAS | None | No | 5.0% |
| Octyl trimethylammonium chloride | Monoalkyltrimethyl QAS | Short chain alkyl | No | 5.0% |
| Silquat AO (Hydrophilic) | Dialkyldimethyl QAS | Siloxane | No | 5.0%<br>3.0% |
| Silquat AO-B (Hydrophobic) | Dialkyldimethyl QAS | Siloxane | No | 5.0%<br>3.0%<br>1.0% |
| Silquat J15 (Hydrophobic) | Dialkyldimethyl QAS | Siloxane | No | 3.0% |
| Silquat J2-B (Hydrophobic) | Dialkyldimethyl QAS | Siloxane | No | 1.2% |

TABLE 5-continued

| | | | | |
|---|---|---|---|---|
| Silquat Di-10 (Hydrophilic) | Dialkyldimethyl QAS (Difunctional) | Siloxane | No | 3.0% 3.0% 1.0% |
| Silquat MO-25 (Hydrophobic) | Dialkyldimethyl QAS | Siloxane | No | 3.0% |
| Silquat 3150 (Hydrophobic) | Dialkyldimethyl QAS | Siloxane, Long chain alkyl | No | 5.0% 5.0% 3.0% |
| Bis(3-trimethoxysilylpropyl)amine | Ammonium (in water, exposure below pH 9) | Alkoxysilane | Yes | 5.0% |

| Additive | Ludox® HS-40 suspension | Wetting | Comments/Observations |
|---|---|---|---|
| N-(trimethoxysilyl)-propyl-N,N,N-trimethyl ammonium chloride | Various | ☺ | As per descriptions given in examples above (see Table 1) |
| N-(trimethoxysilyl)propyl-tetradecyldimethyl-ammonium chloride | 2% | ☺ | |
| | 1% | ☻ | Initial wetting, followed by dewetting at edges |
| | 0.25% | ☹ | |
| 2-[methoxy(polyethyleneoxy)propyl]trimethoxysilane (6-9 EO units) | 6.0% | ☹ | |
| CTAB | 6.0% | ☻ | Addition to paint results in surface disruption |
| Didocyldimethylammonium bromide | 6.0% | ☻ | Addition to paint results in surface disruption |
| BYK 163 | 6.0% | ☹ | |
| | 6.0% | ☻ | Loading at this level results in disruption of surface quality |
| BYK 2000 | 6.0% | ☹ | |
| | 6.0% | ☻ | Loading at this level results in disruption of surface quality |
| Benzyl trimethylammonium chloride | 6.0% | ☹ | Surface disruption |
| Octyl trimethylammonium chloride | 6.0% | ☹ | |
| Silquat AO (Hydrophilic) | 1% | ☻ | |
| | 1% | ☻ | |
| Silquat AO-B (Hydrophobic) | 6% | ☹ | |
| | 1% | ☹ | |
| | 6% | ☹ | |
| Silquat J15 (Hydrophobic) | 1% | ☹ | |
| Silquat J2-B (Hydrophobic) | 1% | ☹ | |
| Silquat Di-10 (Hydrophilic) | 1% | ☹ | |
| | 6% | ☻ | Initial panel wetting followed by dewetting |
| | 6% | ☹ | |
| Silquat MO-25 (Hydrophobic) | 1% | ☹ | |
| Silquat 3150 (Hydrophobic) | 1% | ☻ | Initial wetting followed by dewetting at edges |
| | 6% | ☻ | |
| | 6% | ☹ | |
| Bis(3-trimethoxysilylpropyl)amine | 6% | ☻ | |

Superhydrophilic wetting-☺; Incomplete wetting-☻; Non-wetting-☹
These results suggest that quaternary ammonium ions are generally useful for this process, more heavily alkylated QAS (more charge shielding) show lower activity, and alkoxy silanes are most effective within this group.

Example 13: Effect of Concentration on Laponite S482 Coating

Concentration of surface active ion was varied in the paint at levels of 1, 3, 4, and 5% w/w. Concentration of Laponite S482 in aqueous suspension was varied at levels of 0.01, 0.05, 0.1, 0.5, 1 and 2% w/w. The boundary level for film formation is defined as the point at which the aqueous suspension shows superhydrophilic wetting of the paint surface.

TABLE 6

| Laponite concentration | Electroactive additive concentration in paint (% w/w) | | | |
|---|---|---|---|---|
| w/w in water | 1 | 3 | 4 | 5 |
| .01 | ⊗ | ⊗ | ⊗ | ⊗ |
| .05 | ⊗ | ⊗ | ⊗ | ⊗ |
| .1 | ⊗ | ⊗ | ⊗ | ⊗ |
| .5 | ⊗ | ☺ | ☺ | ☺ |
| 1 | ⊗ | ☺ | ☺ | ☺ |
| 2 | ⊗ | ☺ | ☺ | ☺ |

Superhydrophilic wetting-☺; Non-wetting-⊗

These results show that both the electroactive additive and Laponite S482 concentrations need to be at optimal levels in order for superhydrophilic wetting of the substrate surface to occur, where superhydrophilic wetting indicates that surface modifying particles are bound to the substrate in a dense array.

Example 14: Detection of the Additive at the Paint Surface

The presence of the electroactive additive in the paint film was monitored according to the depth profile populations of silicon and chlorine as measured by glow discharge optical emission spectroscopy (GDOS). A commercial coil coating formulated by PPG Australia was used to demonstrate the activity of the electroactive additive. The composition of this paint system can be described generically according to the typical characteristics of this class of materials, as follows. It is a solvent borne paint of approximately 50% volume solids. Approximately 40% of the solids are pigments, predominantly titanium dioxide. Of the remaining 60% of solids, approximately 80% of that amount is a hydroxyl-functional polyester resin and 20% is an alkylated melamine formaldehyde crosslinking resin. The mixture includes small amounts of additives including an acid catalyst for curing. GDOS measurements were performed on an unmodified control and on a modified paint containing 5% w/w of the electroactive additive N-(3-trimethoxysilylpropyl)-N,N,N-trimethyl ammonium chloride.

Figure 2:
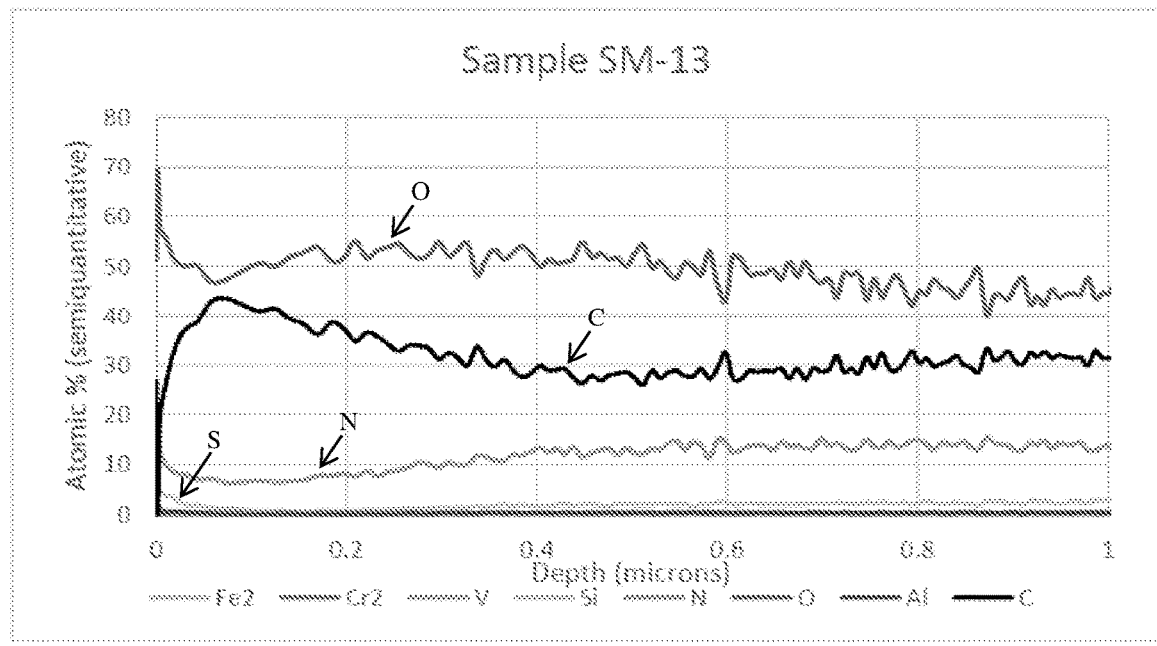
FIG. 2 depicts the depth profile populations of elements in the immediate surface of Sample SM-13, (having paint without the electroactive additive) as measured by glow discharge optical emission spectroscopy (GDOS).
Figure 3:
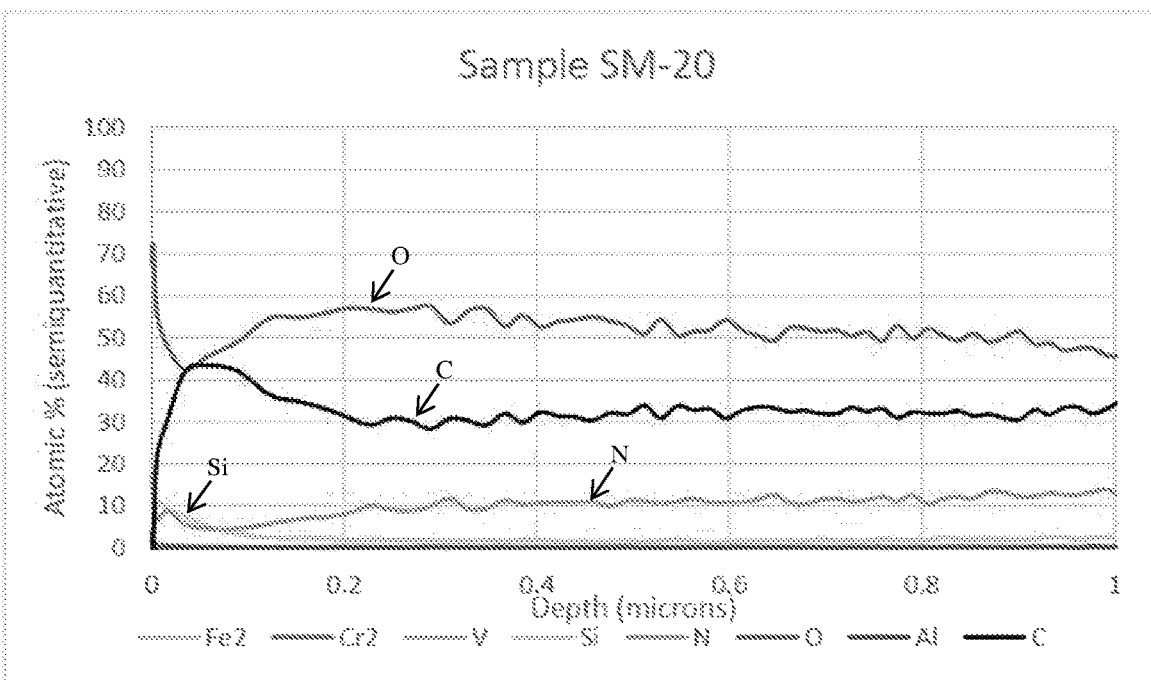
FIG. 3 depicts the depth profile populations of elements in the immediate surface of Sample SM-20, (having paint with the electroactive additive) as measured by glow discharge optical emission spectroscopy (GDOS). Comparison to FIG. 2 shows that the population of silicon in the immediate surface region is enhanced, presumably due to segregation of the silicon containing SSS to the surface of the paint.

FIGS. 2 and 3 depict the populations of elements in the immediate surface of two examples: Sample SM-13 and Sample SM-20, paints without and with the electroactive additive, respectively. The GDOS trace illustrates the atomic percent of silicon in the top one micron of paint volume. Comparison of the data for the two cases shows that the silicon population at the immediate surface is higher (10% versus 4%) for the paint containing the electroactive additive, and that the integrated intensity of the signal through a depth of 0.2 microns is significantly greater. (The source of silicon in the unmodified paint is a silicon containing surfactant.)

Figure 4:
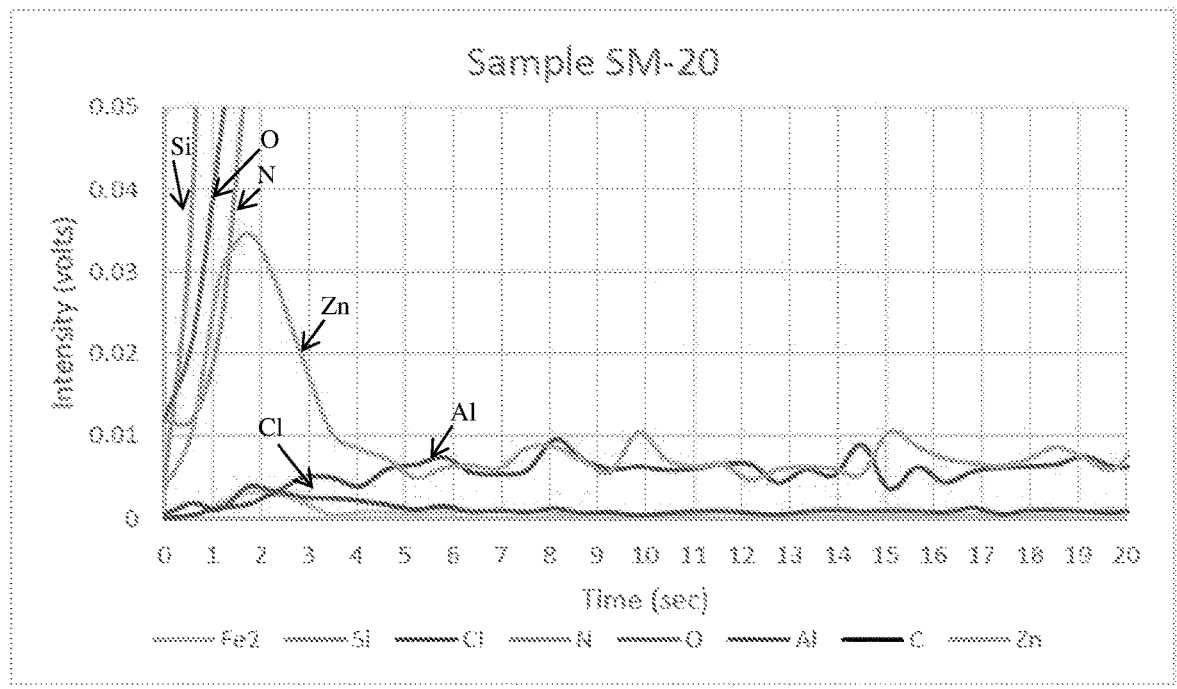
FIG. 4 is a GDOS trace of Sample SM-20 that shows the presence of a chlorine signal in the immediate surface region of the paint containing the electroactive additive.

FIG. 4 is a GDOS measurement of the elemental depth profile of a sample of paint containing 5% of the additive N-(3-trimethoxysilylpropyl)-N,N,N-trimethyl ammonium chloride. It shows the presence of a chlorine signal in the immediate surface region of the paint containing the electroactive additive. These results show that the electroactive additive has migrated to the surface of the paint and is localised in the immediate surface region. It is inferred that as a result of localisation in this manner the additive is available to interact electrostatically with ionic materials in a supernatant liquid in the manner described in the disclosure.

Figure 5:
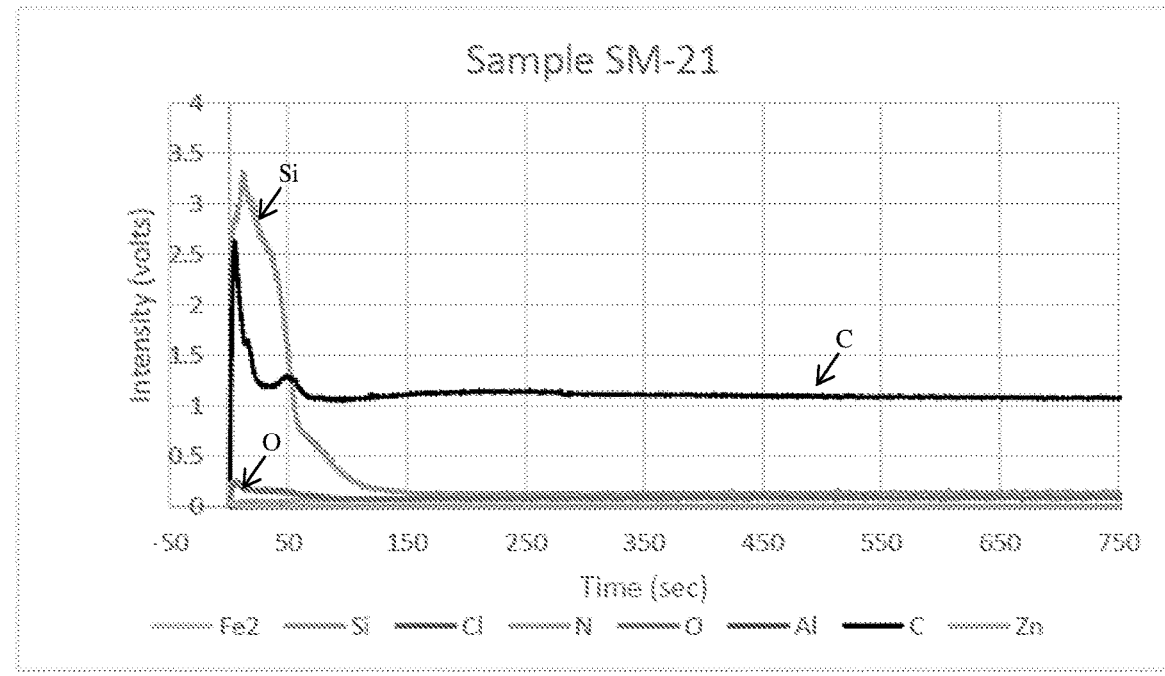
FIG. 5 depicts the elemental depth profiles for Sample SM-21: a paint containing 5% N-(3-trimethoxysilylpropyl)-N,N,N-trimethyl ammonium after treatment with 6% Ludox suspension at pH 8, as measured by GDOS.
Figure 6:
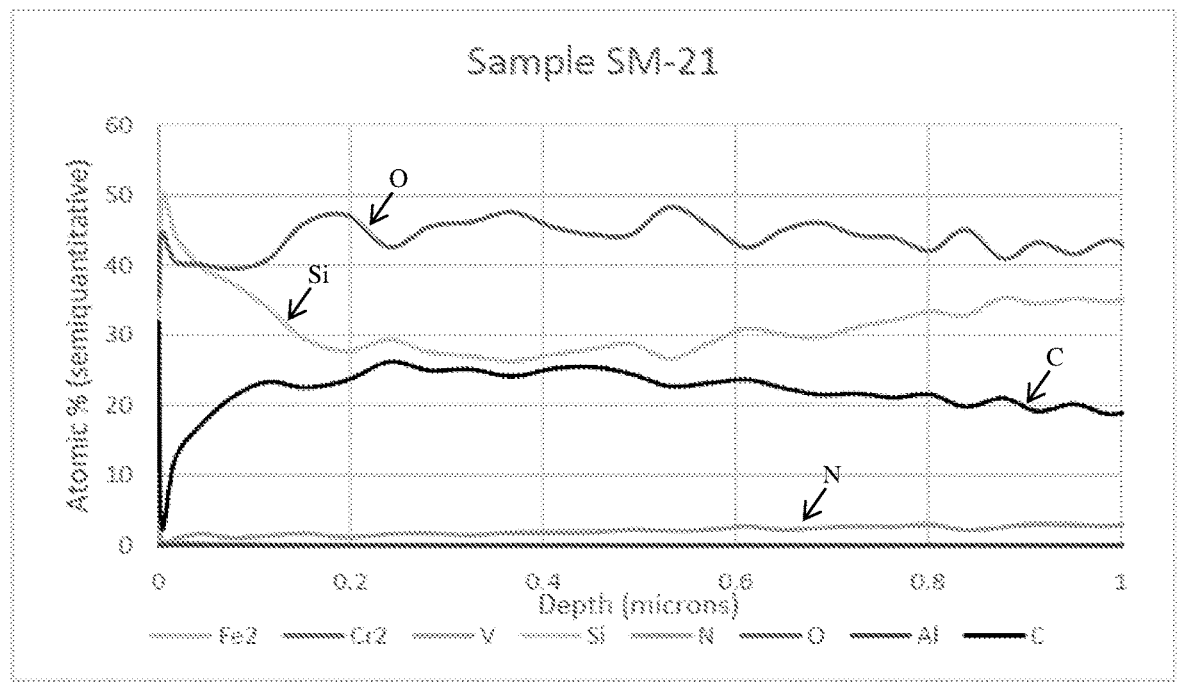
FIG. 6 depicts the depth profile populations of elements in the immediate surface of Sample SM-21, (having paint with the electroactive additive) as measured by GDOS.

Example 15: Detection of the Ludox® Colloidal Silica Layer at the Surface of the Paint and Estimation of Thickness A paint sample panel SM-21 containing the electroactive additive (5% w/w) was exposed to an aqueous suspension of Ludox colloidal silica (5% w/w). The aqueous suspension completely wet the surface of the paint. The panel was allowed to dry in air. The dried panel was analysed by GDOS to reveal the depth profile of elements (FIGS. 5 and 6). FIG. 5 is a crude measurement which illustrates that the treatment results in formation of a layer of silica colloid on the surface. FIG. 6 is a finer measurement that allows an estimate of the average thickness of the deposited silica layer, at ca. 100 nm.

The GDOS results in FIG. 6 show that the immediate surface region of the paint is composed entirely of silicon and oxygen. With increasing depth, the silicon concentration population decreases as the carbon (from the paint) concentration increases. This behaviour is typical of low resolution measurements on rough surfaces where the signals corresponding to layers of different elemental composition are mixed, due to non-uniform etching caused by surface roughness.

In general the surfaces of coil coating paints such as this one with moderate surface gloss have an Ra surface roughness on the order of one micron with numerous spikes and discontinuities. In such cases the thickness of a surface layer is approximated as being equal to the half-height of an element known to have a stable concentration in the matrix but zero concentration in the surface layer. Therefore by using the half height of the nitrogen signal we can make a rough estimate a thickness of the colloidal silica layer of approximately 100 nm.

This result supports the inference that drying of the aqueous layer formed by superhydrophilic wetting of the Ludox® suspension on the electroactivated paint surface results in deposition of all of the material in the supernatant liquid film. Without being bound by theory it is reasonable to suggest that the electrostatic attraction between the surface active ion in the paint and the surface modifying ionic material suspended in the aqueous phase will reach an equilibrium state of charge neutralisation where the immediate surface of the paint is covered in a layer of the surface modifying ionic material approximating a monolayer in thickness, and as a result any of the surface modifying ionic material remaining freely suspended In the aqueous phase will be electrostatically repelled from this surface.

As illustrated in FIGS. 1a to 1d, the forces of repulsion between nanoparticulate materials at relative large distances from each other increase exponentially as the distance between the particles is reduced. However at a critical point in the very close approach of the particles attractive forces increase rapidly and become dominant such that the particles now experience a strong attraction. Once nanoparticles establish adhesion to each other it becomes very difficult to counter the forces holding them together.

In this way the electroactive deposition method can be used to deposit a thin coating of controlled thickness and good structural integrity.

Figure 7:
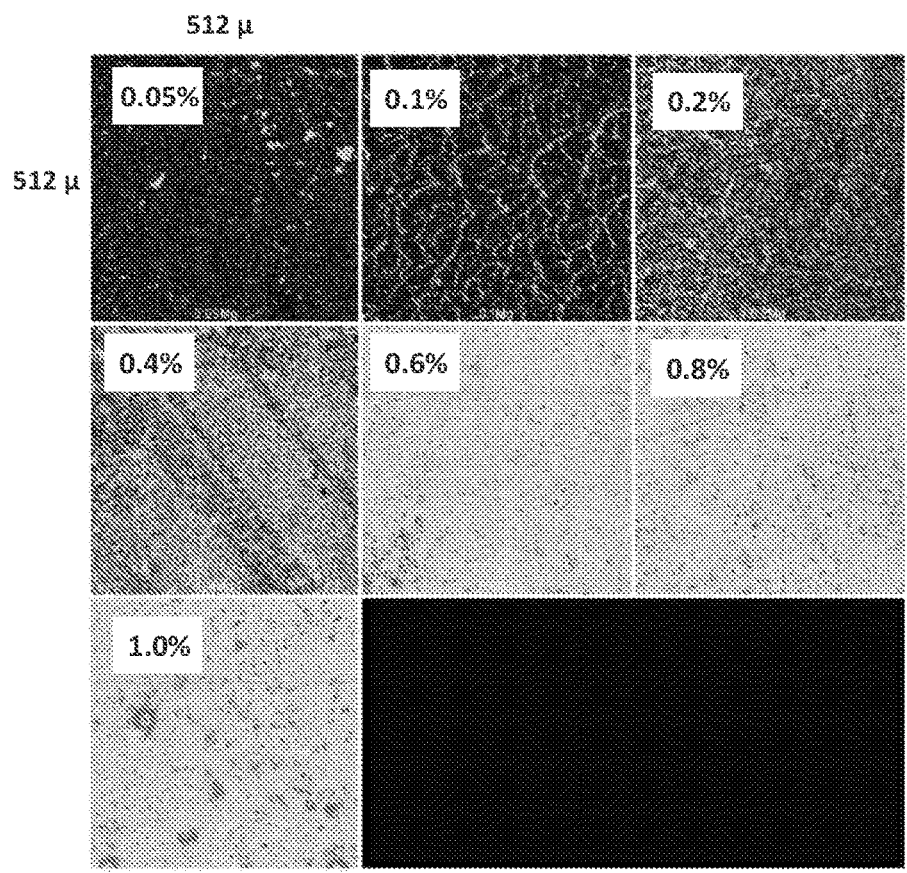
FIG. 7 shows EPMA maps of the Mg signal at varying concentrations of Laponite suspensions as described in Example 16. The Mg signal is a proxy for Laponite concentration.

Example 16: Detection of the Laponite Phyllosilicate Particle Distribution on the Paint Surface Paint panels containing 5% w/w of the electroactive additive N-(3-trimethoxysilylpropyl)-N,N,N-trimethyl ammonium chloride were dipped into aqueous suspensions of Laponite® S482 phyllosilicate of varying concentrations at levels of 0.05, 0.1, 0.2, 0.4, 0.6, 0.8 and 1.0% w/w. The panels were dried and analysed by EPMA, mapping the Mg signal and the results are presented in FIG. 7. Mg is unique to Laponite in this formulation and therefore is diagnostic of the presence of Laponite on the surface. The size of the mapping area of the paint coupons is 512 μm by 512 μm. The presence of Mg is mapped on a scale of 0 (blue) to 32 (red), where 32 is the maximum value recorded. In these results it is clear that the surface approaches complete coverage (as observable under the resolution of this technique) at a Laponite concentration between 0.4 and 0.6% which is in keeping with the results in the example for the determination of boundary conditions.

Example 17: Evidence of Improved Adhesion

Samples of paint containing the SSS were treated with suspensions of commercial silica products according to the specifications given in Table 7. Control samples include a standard paint with no SSS and no silica, and a paint where a silica coating was applied on a standard paint panel without the SSS additive. The water contact angle and carbon absorption resistance, using the procedure below, was measured for each sample.

Each sample was subjected to a "water double rub" procedure. In this procedure the surface of the paint is rubbed both forward and reverse with 10 repetitions with a wet cotton pad. The water contact angle and carbon absorption resistance tests were repeated on the panel after the water rubbing test. An increase in the water contact angle indicates removal of the silica. An increase in $\Delta L$ (i.e. darkening) of the panel due to carbon absorption also indicates removal of the silica coating where presence of a silica layer acts as a barrier to absorption of carbon dust on the paint surface.

These results show that presence of the SSS dramatically improves the adhesion of the silica to the surface as reflected in the maintenance of the original contact angle and carbon absorption resistance.

TABLE 7

| Additive Level in Paint | Coating system/conditions | Water Contact Angle (°) | | $\Delta L$ (after 6 + 10 brushing cycles) | |
|---|---|---|---|---|---|
| | | After initial silica coating | After 10 water DRs | After initial silica coating | After 10 water DRs |
| 5% | 6% w/w Bindzil C8 | 15.33 | 10 to 12.74 | −3.73 | −4.48 |
| 5% | 6% w/w Bindzil C50 | 23.77 | 28.62 | −9.48 | −11.94 |
| 5% | 6% w/w Bindzil cc301 | <10 | <10 to 10 | −4.31 | −5.45 |
| 5% | 6% w/w Bindzil cc151 | 18.38 | 21.11 | −5.88 | −8.72 |
| 3% | 6% w/w Ludox HS-40 | <10 | 10.17 | −6.35 | −6.78 |
| 4% | 6% w/w Ludox HS-40 | 10 to 16.96 | 18.11 | −9.2 | −9.35 |
| 5% | 6% w/w Ludox HS-40 | <10 to 10 | 23.79 | −6.19 | −7.59 |
| 5% | 3% w/w Bindzil C8 + 3% w/w Bindzil C50 | 10.64 to 23.82 | 34.49 | −10.07 | −10.04 |
| 5% | 5.05% w/w Bindzil C8 + 0.94% w/w Bindzil C50 | <10 to 10 | 14.54 | −9.21 | −7.77 |
| 5% | 5.5% w/w Bindzil C8 + 0.5% w/w Bindzil C50 | <10 to 10 | 15.79 | −10.94 | −9.81 |
| No additive | Ludox HS-40 | 37.16 | 84.71 | −2.07 | −22.64 |
| No additive | No coating | 80.24 | — | −37.8 | |

Carbon Absorption Resistance Procedure:

The carbon used is Special Black 4 Powder, from Evonik Degussa Australia Pty. Ltd. The initial "L" colour data of the panel is recorded using the Hunter Lab system. A 15 w/w % carbon slurry in water is applied on the sample surface (about 4 cm diameter area) and the sample is dried at 70° C. for 1 hr. After removal from the oven the sample is allowed to cool. Loosely adhered carbon powder is tipped gently from the surface. The sample is placed under running water and additional carbon is removed from the surface by brushing six times with a soft paint brush. The sample is dried and colour reading "L" value is recorded. The sample is again placed under running water and additional carbon is removed from the surface by brushing a further ten times with a soft paint brush. The sample is dried and colour reading "L" value is recorded.

Example 18. Variation of the Silica Coating Thickness

A paint sample panel SM-21 containing N-(3-trimethoxysilylpropyl)-N,N,N-trimethyl ammonium chloride (5% w/w) was exposed to an aqueous suspension of Ludox HS40 colloidal silica (6% w/w) for 5 seconds. After removal from the mixture the panel was dried in an oven at 100 C for 60 seconds. The silica coating thickness was estimated by EPMA to be 510 nm.

Figure 8:
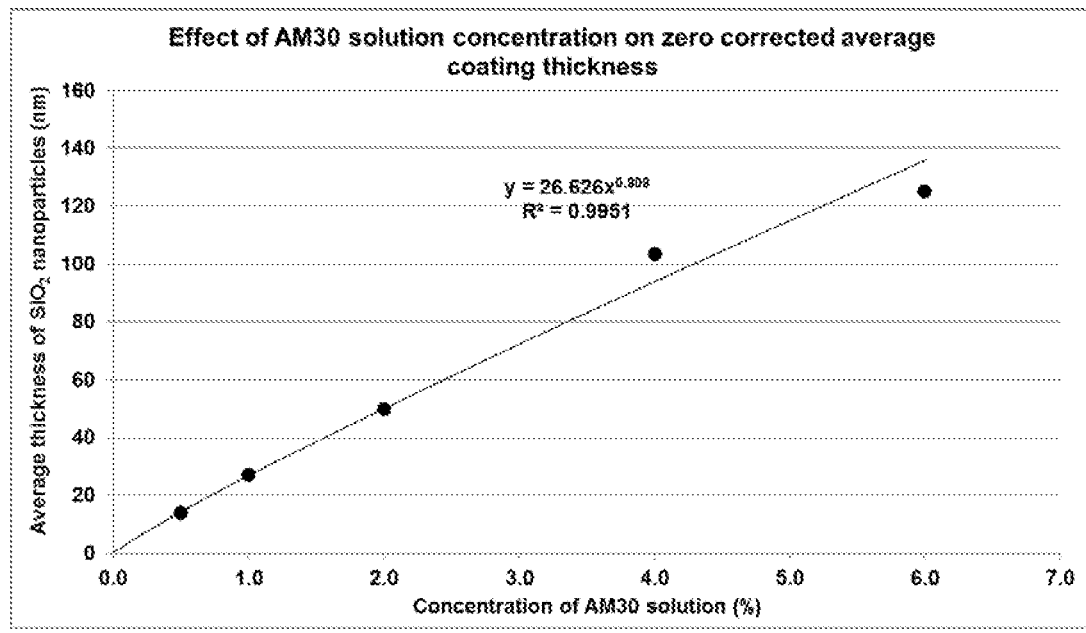
FIG. 8: Graph showing relationship between Ludox® AM30 silica suspension concentration and silica coating thickness.
Figure 9:
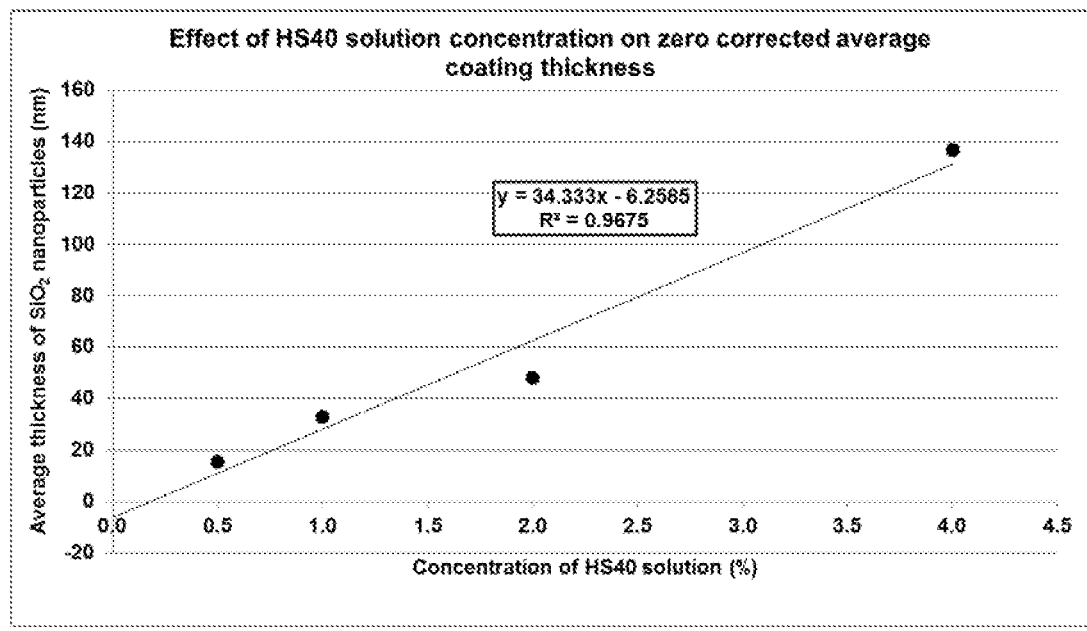
FIG. 9: Graph showing relationship between Ludox® HS40 silica suspension concentration and silica coating thickness.

Variable coating thicknesses can be obtained by using more dilute silica suspensions. A drawdown bar technique was used with silica suspensions of varying concentration. Ludox® HS40 and Ludox® AM30 silica suspensions were applied to a paint sample panel SM-21 containing the electroactive additive (5% w/w) using a #0003 drawdown bar (Gardiner). The panel was dried in an oven at 100 C for 20 seconds. Silica coating thickness estimates were obtained by EPMA (Table 8). FIGS. 8 and 9 show that the silica coating thickness is proportional to the silica concentration for a given liquid film thickness for Ludox® HS40 and Ludox® AM30 respectively.

TABLE 8

| Silica Type | Silica Concentration (% w/w in water) | Silica Coating Thickness (nm, EPMA Estimate) | Area of SiO absorption envelope (ca 1200 cm$^{-1}$) |
| --- | --- | --- | --- |
| Ludox HS40 (drawdown) | 0.5 | 15 | — |
|  | 1 | 33 | 158 |
|  | 2 | 48 | 196 |
|  | 4 | 137 | 440 |
| Ludox AM30 (drawdown) | 0.5 | 14 | 101 |
|  | 1 | 27 | 133 |
|  | 2 | 50 | 189 |
|  | 4 | 103 | 384 |
|  | 6 | 125 | 593 |
| Ludox HS40 (dip coating) | 6 | 513 | — |

Figure 10:
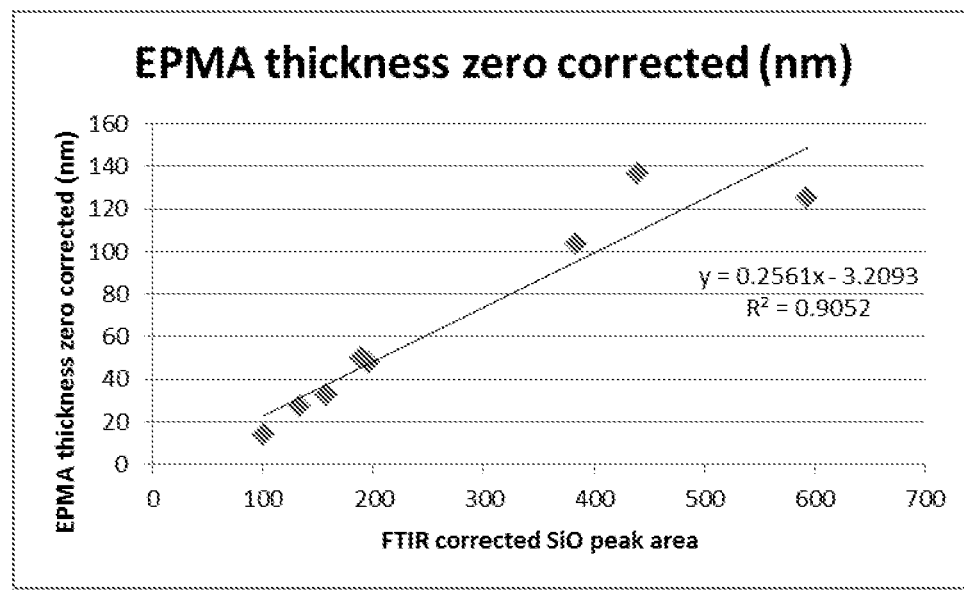
FIG. 10: Graph showing correlation between silica thickness determined via EPMA versus SiO IR absorption peak area at 1200 $cm^{-1}$.

FTIR (Fourier transform infrared spectroscopy) spectroscopy was used to establish a correlation between EPMA (Electron Probe Microanalyser) thickness determination versus the integrated intensity of the silica absorption peak in the region of 1200 cm-1 in the mid IR. The sample panels used for EPMA were measured by ATR (Attenuated total reflection) spectroscopy on a Perkin Elmer Spectrum instrument using a diamond crystal. The digital difference spectrum was obtained for the silica peak of a coated versus uncoated paint panel. The area of this peak was determined by digital integration (Table 8) and these values were correlated to EPMA thickness (FIG. 10). Accordingly, FTIR can be used to detect the presence of a silica coating applied using the method of the present disclosure and to estimate its thickness using this correlation.

Example 19. Incorporation of Metal/Metal Oxide Nanoparticles into the Silica Colloid Deposition Layer Silver/zinc oxide nanoparticle mixtures (courtesy of the Polymer CRC, U.S. Pat. No. 8,673,367, "Nano silver-zinc oxide composition") were suspended in Ludox HS40 silica suspensions (6% w/w in water) at concentrations of 1%, 5% and 10% w/w relative to silica using a high speed mixer using BYK2010 polymeric dispersant (BYK Additives & Instruments, Altana). The suspensions were not stable to settling. The suspensions were dip coated onto paint sample panels SM-21 [containing N-(3-trimethoxysilylpropyl)-N,N,N-trimethyl ammonium chloride]. The surfaces of the panel were analysed by EPMA to reveal the presence of silver and zinc oxide incorporated into the silica coating. Results are presented for the case of a 5% w/w silver/zinc oxide nanoparticle in silica coating where the silver/zinc oxide nanoparticle composition by mass is approximately 30% silver and 58% zinc with the remainder being oxygen. The results refer to the same analysis area. The only source of silver and zinc in these systems is from the incorporated nanoparticle mixture. The silver/zinc oxide mixture is reported to have antibacterial properties. Therefore the disclosed process can be used to prepare a surface treatment where the silica effectively functions as a binder for other materials that may alter the chemical properties of the surface.

Figure 11:
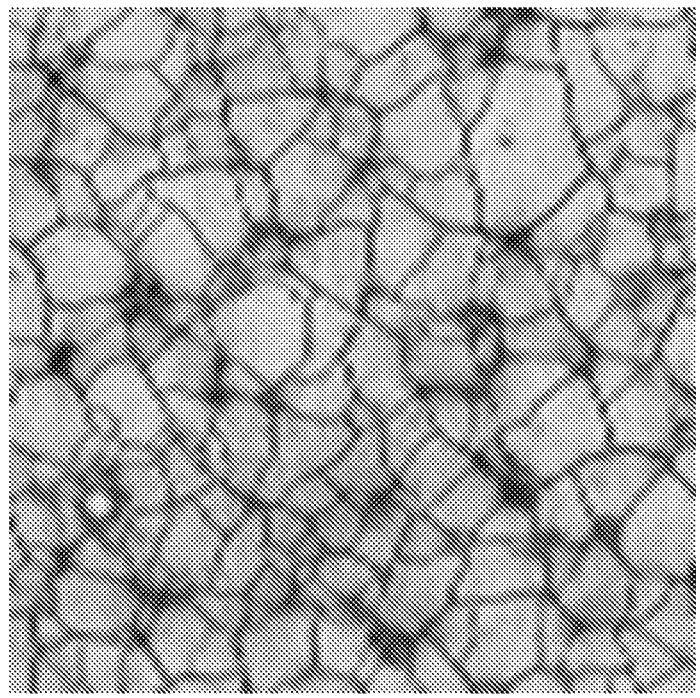
FIG. 11: EPMA analysis of the surface of a sample paint panel SM-21 coated with a silver/zinc oxide nanoparticle in silica mixture (5%).
Figure 12:
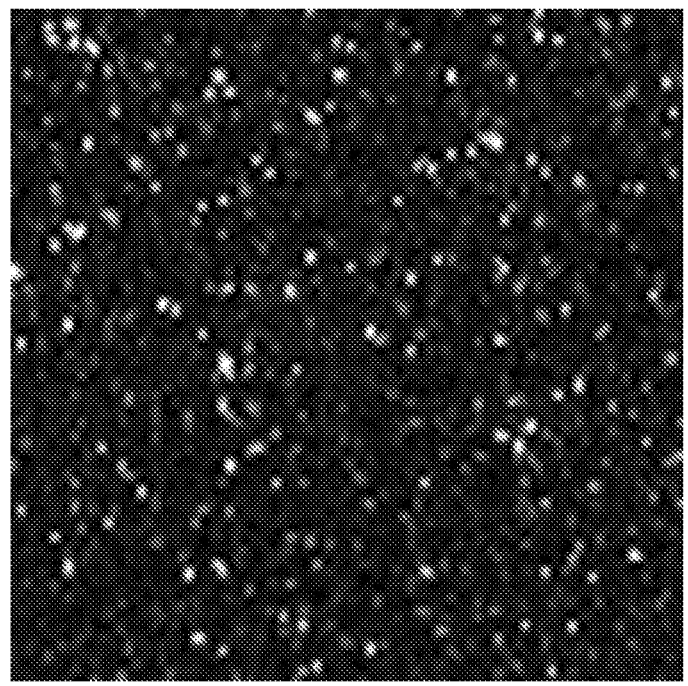
FIG. 12: EPMA silver distribution map of the surface of a sample paint panel SM-21 coated with a silver/zinc oxide nanoparticle in silica mixture (5%).
Figure 13:
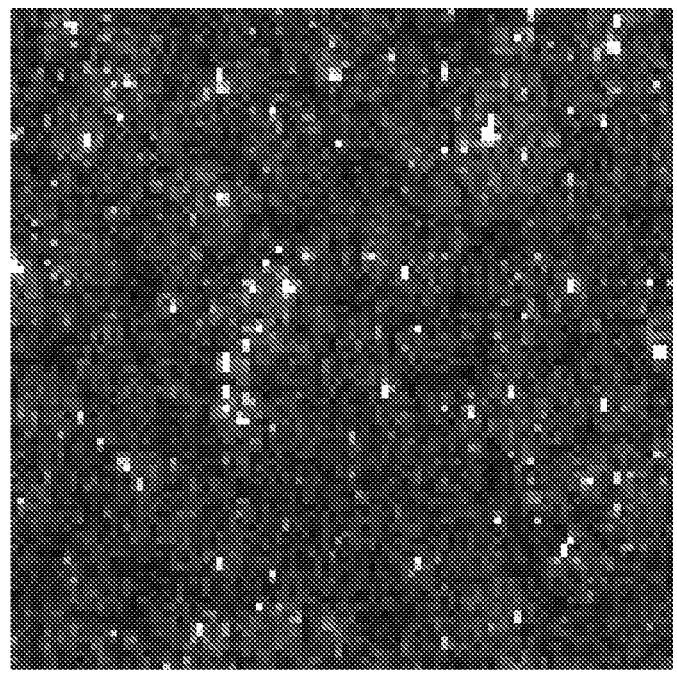
FIG. 13: EPMA zinc distribution map of the surface of a sample paint panel SM-21 coated with a silver/zinc oxide nanoparticle in silica mixture (5%).

FIGS. 11, 12 and 13 show EPMA distribution maps of silica, silver and zinc, respectively, of the surface of the sample paint panel SM-21 (containing N-(3-trimethoxysilylpropyl)-N,N,N-trimethyl ammonium chloride) coated with a silver/zinc oxide nanoparticle in silica mixture (5%). The map area is 512 microns by 512 microns. In each case, the white areas indicate higher concentrations of the mapped element [please confirm]. Comparison of FIGS. 12 and 13 indicate the correspondence between silver and zinc maps, that is, the observed signals are due to the silver/zinc oxide mixed nanoparticle.

Example 20. Incorporation of Polymer Latex into the Silica Colloid Deposition Layer Two PVDF (polyvinylidene difluoride)/acrylic resin latexes were used, including Kynar Aquatec® ARC and Kynar Aquatec® CRX, both obtained from Arkema. These are both anionic latex suspensions with particle sizes of approximately 100 nm. Ludox HS40 was mixed with the Kynar latex in water according to the mass ratios given in Table 9 to give stable suspensions, where the total mass of suspended solids was 2% of the mixture. Paint sample panels SM-21 with 5% w/w electroactive additive in the paint were coated with the colloid mixtures using a #0003 drawdown bar. Water contact angle data (for Kynar CRX systems) illustrates that the contact angle increases as the proportion of Kynar resin latex increases. That is, as the proportion of hydrophobic fluorocarbon Kynar increases the surface becomes more hydrophobic. In this way the silica acts as a binder to allow surface modification with latexes and in that way to manifest the latex properties on the surface of the paint, thereby to alter the physical properties of the surface.

TABLE 9

| Kynar CRX/Silica mass ratio | Water contact angle (deg) |
| --- | --- |
| 0 (100% silica) | <10 |
| 0.2 | 39 |
| 0.4 | 48 |
| 0.6 | 58 |
| 0.8 | 59 |
| 1.0 | 55 |
| 1.2 | 64 |

Figure 14:
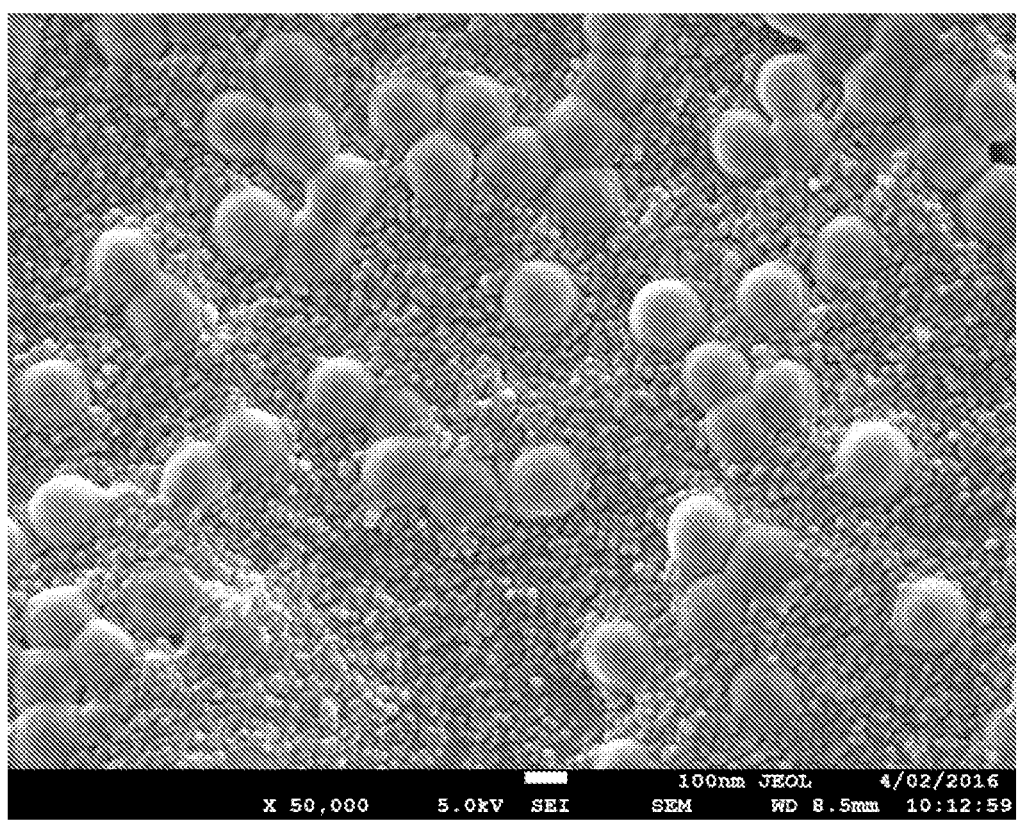
FIG. 14: Photomicrograph of an area of the coating formed from Kynar ARC PVDF latex and Ludox HS40 mixture.

FIG. 14 is a FEGSEM photomicrograph at 50,000 times magnification of an area of the coating formed from the Kynar ARC PVDF latex and Ludox HS40 mixture. The Kynar:Ludox mass ratio was 0.4 in a total 2% solids aqueous suspension. As shown in FIG. 14, the larger Kynar ARC latex particles are distributed throughout in the mass of smaller Ludox silica colloid particles.

Hydrophobic/hydrophilic segregation in the system is largely avoided as the surfaces of the particles are anionic while suspended.

Example 21. Use of Silica Suspensions in Water/Alcohol Mixtures

A 3% Ludox® HS40 v/v suspension in water (6% w/w) was diluted with methanol to a 1% v/v mixture. The suspension is stable and clear with no evidence of particle coalescence. Sample paint panels with varying levels of electroactive additive were dipped into this suspension. The suspension was also applied to sample panels with varying levels of electroactive additive using a #0003 drawdown bar. Observations are recorded in Table 10. The presence and thickness of a silica coating was determined by FTIR spectroscopy using the relationship illustrated in FIG. 10 above. This data illustrates that suspensions in solvent mixtures can be used to prepare silica coating by ion exchange by the method of this disclosure. Solvent mixtures change the ability to wet the hydrophobic paint surface. It is believed that solvent mixtures affect the many aspects of the mechanisms of the processes at work that are influenced by hydrogen bonding among water molecules.

TABLE 10

| Conditions | Observations | Silica coating thickness estimate (FTIR) |
|---|---|---|
| 0% electroactive additive; dip coating | Initial panel wetting. On drying the liquid beads up rapidly. No permanent silica coating formed. Contact angle same as uncoated paint surface. | 0 |
| 1% electroactive additive; dip coating | Initial panel wetting. On drying the liquid beads up slowly. No permanent silica coating formed. Contact angle same as uncoated paint surface. | 0 |
| 2% electroactive additive; dip coating | Initial panel wetting. Wetting is persistant on drying. Contact angle <10 degrees. SiO peak area = 173 | 41 nm |
| 5% electroactive additive; dip coating | nitial panel wetting. Wetting is persistant on drying. Contact angle <10 degrees. SiO peak area = 162 | 38 nm |
| 0% electroactive additive; drawdown | Panel doesn't wet. No permanent silica coating formed. Contact angle same as uncoated paint surface. | 0 |
| 1% electroactive additive; drawdown | Initial panel wetting. On drying it is revealed that no permanent silica coating formed. Contact angle same as uncoated paint surface. | 0 |
| 2% electroactive additive; drawdown | Initial panel wetting. Wetting is persistant on drying. Contact angle <10 degrees. SiO peak area = 1925 | 490 nm |
| 5% electroactive additive; drawdown | Initial panel wetting. Wetting is persistant on drying. Contact angle <10 degrees. SiO peak area = 1058 | 268 nm |

Whilst a number of specific process embodiments have been described, it should be appreciated that the process may be embodied in many other forms.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

Further patent applications may be filed in Australia or overseas on the basis of, or claiming priority from, the present application. It is to be understood that the following provisional claims are provided by use of example only and are not intended to limit the scope of what may be claimed in any such future applications. Features may be added to or omitted from the provisional claims at a later date so is to further define or re-define the invention or inventions.

The invention claimed is:

1. A process for coating a product by ion exchange comprising:
    a) providing a product with a mixture comprising a polymer and a surface segregating species (SSS), wherein the SSS is an electroactive compound having a low surface energy component and an ionic component, and wherein the SSS has segregated to an outer surface of the product to form an activated surface; and
    b) treating the activated surface of the product with a liquid comprising a surface modifying agent comprising one or more polyionic species, wherein the polyionic species is attracted to and deposits on the activated surface through a process of ion exchange.

2. The process of claim 1, wherein step b) further includes the formation of a superhydrophilic layer from the deposited polyionic species;
    the process further including the step:
        c) drying the superhydrophilic layer to form said coating.

3. The process of claim 1, wherein the mixture is a paint, and wherein the polymer and the SSS is provided within the paint, and wherein the SSS has segregated to an outer surface of the paint.

4. The process of claim 3, wherein the SSS has a concentration in the paint selected from the group consisting of: at least 0.5 wt %, between 0.5 wt % and 10 wt %, between 0.5 wt % and 5 wt %, and between 2 wt % and 5 wt %.

5. The process of claim 3, wherein the paint is a polyester-melamine based, thermally cured paint system.

6. The process of claim 3, wherein the SSS is added to the paint when the paint is still liquid and subsequently segregates to the surface of the paint layer.

7. The process of claim 1, wherein the low surface energy component of the SSS comprises one or more of the following: a siloxane derivative, a long chain alkyl group, a branched structure, a nonionic surfactant of the alkylene oxide oligomer or polymer type, a fluorocarbon or a dendrimer.

8. The process of claim 1, wherein the ionic component of the SSS is comprised of an organic cation covalently bound to the low surface energy component, in association with a mobile additive counterion.

9. The process of claim 8, wherein the cation comprises a quaternary ammonium ion.

10. The process of claim 1, wherein the ionic component of the SSS is comprised of an anion, preferably wherein the anion comprises part of the low surface energy group, more preferably part of a long chain alkyl group.

11. The process of claim 1, wherein the SSS comprises a salt of an organic cation, or a precursor of a salt of an organic cation.

12. The process of claim 11, wherein the salt of an organic cation comprises a quaternary ammonium cation, a quaternary phosphonium ion, or a thiouronium cation.

13. The process of claim 1, wherein the SSS comprises a quaternary ammonium cation (QAS) having low charge shielding.

14. The process of claim 13 wherein the SSS comprises one or more of N-(3-trimethoxysilylpropyl)-N,N,N-trimethyl ammonium chloride, N-(trimethoxysilyl) propyl-tetradecyldimethyl-ammonium chloride, a benzyltrimethylammonium chloride, N-(3-trimethoxysilylethyl)benzyl-N,N,N-trimethylammonium chloride, cetyl trimethylammonium bromide (CTAB), and a silicone quaternary surfactant containing a quaternary ammonium functional group.

15. The process of claim 1, wherein the surface modifying agent comprises one or more of an electrostatically stabilized colloidal suspension, a metal or non-metal oxide, material held in suspension through use of an ionic dispersant or as an emulsion, or a soluble polyionic organic polymer.

16. The process of claim 1, wherein the surface modifying agent comprises surface modifying ionic materials in association with their corresponding mobile phase counter ions, further wherein the surface modifying ionic materials are dissolved in the liquid or held in suspension in the liquid by electrostatic stabilisation.

17. The process of claim 1, wherein the surface modifying agent comprises one or more of: silica colloids; mixtures of silicas of various sizes; mixtures of functionalised silicas and polymer latexes; functionalised polymer latexes and their mixtures; layered double hydroxides; phyllosilicates; graphene oxide; particles suspended in water using electro steric dispersants; polyionic polymers; conductive polymers and cyclodextrins.

18. The process of claim 17, wherein the silica colloid has a concentration in the liquid selected from the group consisting of: at least 0.05 wt %, at least 0.25 wt %, and at least 0.5 wt %.

19. The process of claim 17, wherein the surface modifying agent is a smectic phyllosilicate present at a concentration of at least 0.05 wt %, preferably at least 0.4 wt %.

20. The process of claim 17, wherein the surface modifying agent comprises a silica colloid.

21. The process of claim 20, wherein the silica colloid comprises silica particles having a size from 5 nm to over 100 nm.

22. The process of claim 17, wherein the surface modifying agent comprises a functionalised silica colloid.

23. The process of claim 1, wherein the liquid has a pH selected from the group consisting of: less than or equal to 10, less than or equal to 9, and less than or equal to 7.

24. The process of claim 23, wherein the liquid has a basic pH.

25. The process of claim 1, wherein in step (b), the ionic strength of the liquid is adjusted.

26. The process of claim 1, wherein step (b) is conducted in a single pass.

27. The process of claim 1, wherein the product comprises steel.

28. The process of claim 27, wherein the product is steel coil.

29. The process of claim 1, wherein the surface modifying agent comprises an aqueous suspension of a synthetic smectic phyllosilicate clay, preferably laponite at a concentration of at least 0.5 wt %.

30. The process of claim 1, wherein the water contact angle of the coated product is selected from the group consisting of: less than 30°, less than 25°, and less than 20°.

31. The process of claim 1, wherein the low surface energy component of the SSS comprises polyethylene oxide.

32. The process of claim 1, wherein the low surface energy component comprises an organosilane derivative.

33. The process of claim 1, wherein the low surface energy component comprises an alkoxy silane.

34. The process of claim 1, wherein the low surface energy component comprises a trialkoxysilane.

35. A process for coating a product by ion exchange comprising:
   a) providing a product that with a mixture comprising a polymer and a surface segregating species (SSS), wherein the SSS is an electroactive compound having a low surface energy component and an ionic component, and wherein the surface segregating species SSS has segregated to an outer surface of the product to form an activated surface; and
   b) treating the activated surface of the product with a liquid comprising a surface modifying agent which comprises a surface modifying ionic material, wherein the surface modifying ionic material is attracted to and deposits on the activated surface in a process of ion exchange.

* * * * *